United States Patent [19]

Swinderman et al.

[11] Patent Number: 4,898,272
[45] Date of Patent: Feb. 6, 1990

[54] CONVEYOR BELT SUPPORT MECHANISM

[75] Inventors: R. Todd Swinderman, Kewanne; Michael A. Bowman, Sheffield, both of Ill.; Larry J. Goldbeck, Camanche, Iowa

[73] Assignee: Martin Engineering Company, Neponset, Ill.

[21] Appl. No.: 340,870

[22] Filed: Apr. 20, 1989

[51] Int. Cl.⁴ .............................................. B65G 15/60
[52] U.S. Cl. .................................... 198/841; 198/823; 198/860.3; 198/861.1
[58] Field of Search ...................... 198/823, 841, 860.3, 198/861.1

[56] References Cited

U.S. PATENT DOCUMENTS

| | | | |
|---|---|---|---|
| 2,631,717 | 3/1953 | Cox | 198/841 |
| 3,200,940 | 8/1965 | Higgins | 198/841 |
| 3,964,800 | 6/1976 | Grimes et al. | 198/841 |
| 4,202,437 | 5/1980 | Gordon | 198/497 |
| 4,280,619 | 7/1981 | Ward et al. | 198/823 |
| 4,789,056 | 12/1988 | Bourbeau | 198/823 |
| 4,793,470 | 12/1988 | Andersson | 198/841 |

FOREIGN PATENT DOCUMENTS

| | | | |
|---|---|---|---|
| 1047797 | 10/1983 | U.S.S.R. | 198/823 |
| 396184 | 6/1934 | United Kingdom | 198/823 |
| 2188018 | 9/1987 | United Kingdom | 198/823 |

Primary Examiner—Joseph E. Valenza
Attorney, Agent, or Firm—Lee, Mann, Smith, McWilliams & Sweeney

[57] ABSTRACT

A conveyor belt support mechanism comprising a plurality of slider bars, each having multiple low friction wear surfaces with one wear surface in sliding engagement with the conveyor belt and an adjustment mechanism to compensate for wear to said wear surface by moving the slide bar closer to the conveyor belt as the wear surface wears, and a vertical support system for positioning said slider bars. When loads such as impact loads are placed on the conveyor belt, the slider bars support the conveyor belt and prevent the belt from sagging and stretching. As one wear surface of a slider bar becomes worn past an acceptable limit, the slider bar may be removed and repositioned so that a new wear surface engages the conveyor belt.

9 Claims, 2 Drawing Sheets

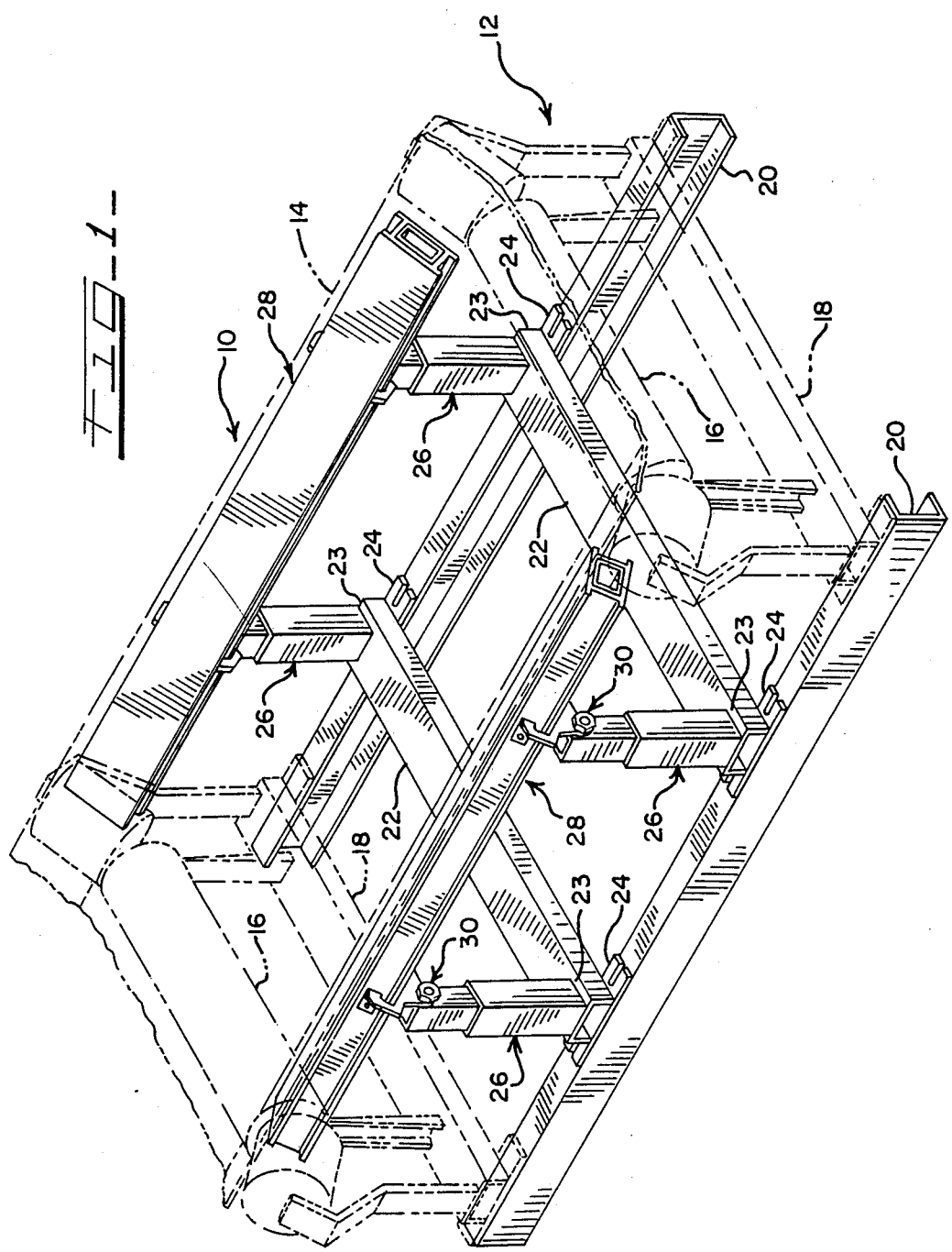

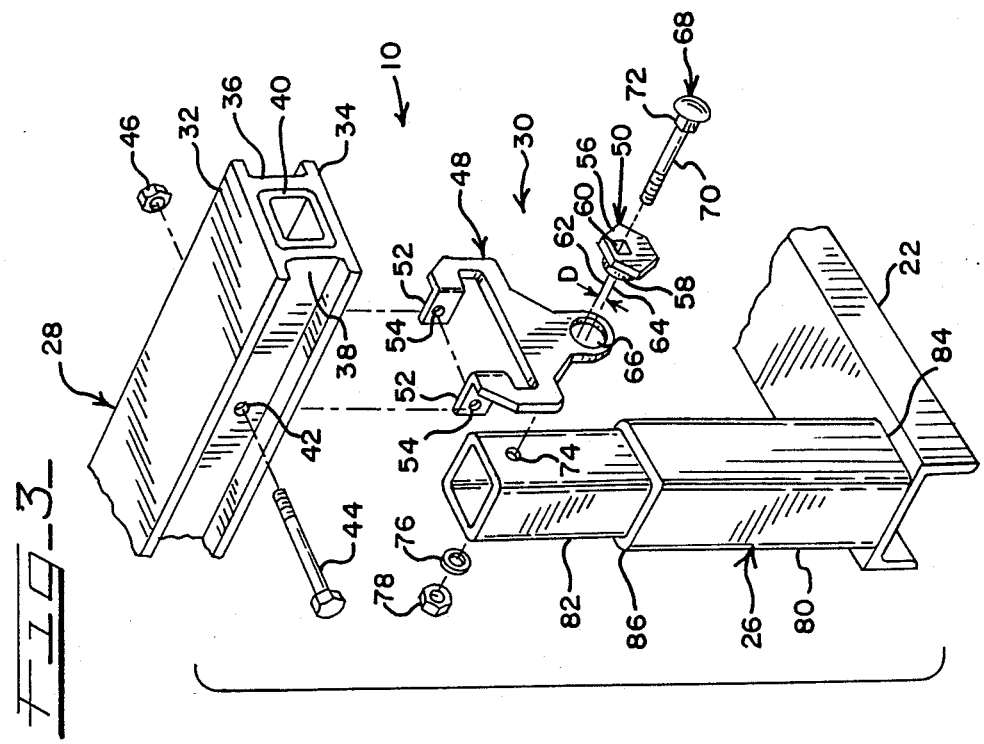
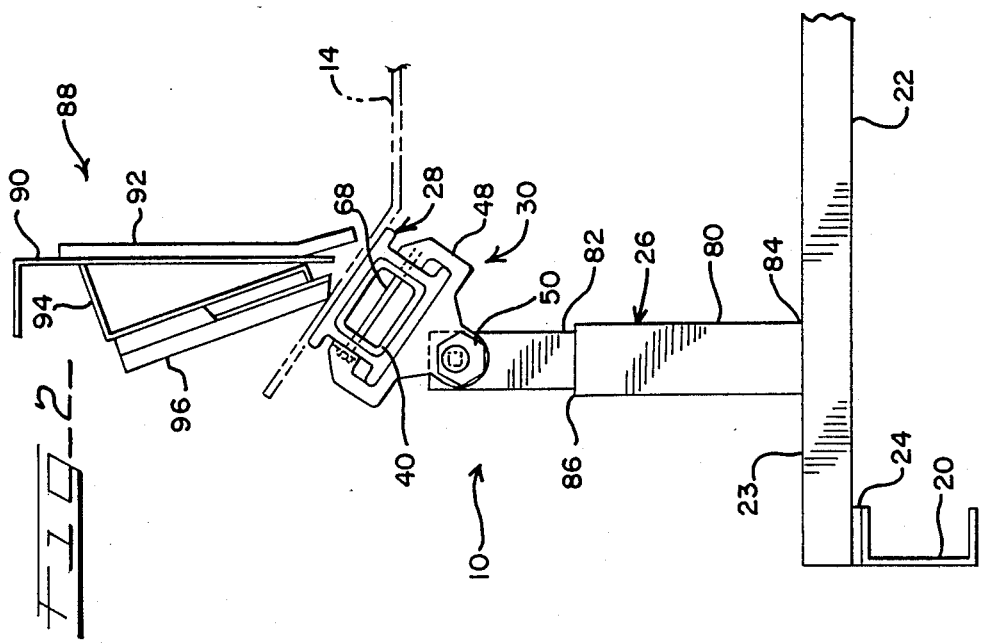

CONVEYOR BELT SUPPORT MECHANISM

BACKGROUND OF THE INVENTION

The present invention relates to a conveyor belt support mechanism which is used to support the edges of a conveyor belt when it is subjected to loads to prevent the belt from sagging and stretching. The support system can also be used to simultaneously maintain a seal with a material chute disposed above the belt. While support mechanisms have been previously used, these prior systems did not have a plurality of wear surfaces, each of which could be rotated into contact with the conveyor belt, nor were they adjustable to compensate for wear to the wear surfaces. Edge support systems are shown in U.S. Pat. Nos. 4,789,056, 4,359,156 and 2,619,222. Conveyor belt wear strips are shown in U.S. Pat. Nos. 3,964,800 and 3,885,837. Adjustment means are shown in U.S. Pat. No. 4,202,437. Means for allowing replacement of an element in contact with a conveyor belt are shown in U.S. Pat. No. 4,787,500 and 3,885,837. However, the prior art does not disclose a support mechanism having a plurality of wear surfaces which may alternatively be positioned against the conveyor belt with an adjustment mechanism such that each such surface is adjustable to compensate for wear.

SUMMARY OF THE INVENTION

The preferred embodiment of the present invention provides a support mechanism which includes a pair of slider bars each located at a respective edge of a conveyor belt. Each slider bar has a plurality of wear surfaces, only one of which is in contact with the underside of the conveyor belt at a given time. The slider bars support the conveyor belt between idler rollers at the edges of the conveyor belt to prevent the belt from sagging and stretching as the belt is loaded from a material chute above the belt. The slider bars assist in providing a seal between the edge of the conveyor belt and the skirt of the material chute thereby preventing material from flowing over the edge of the belt and keeping the dispersion of dust to a minimum.

An adjustment mechanism is provided to adjust the position of the slider bar with respect to the conveyor belt to compensate for wear to the wear surface, thereby preventing the belt from sagging and maintaining a seal with the chute skirt. The adjustment mechanism has a holder or mounting member which releasably secures the slider bar in its operative position and is secured to a stationary vertical support at the other end by an adjusting nut.

As a wear surface on a slider bar becomes thinner the carriage bolt is loosened and the adjusting nut is rotated. The shank of the adjusting nut moves the holder and the slider bar towards the belt, thereby moving the slider bar and belt back to its original position maintaining the seal with the chute skirt.

Each of the slider bars is provided with a plurality of wear surfaces. Once a wear surface of a slider bar is worn beyond a predetermined limit, the slider bar may be removed from the holders, rotated 180°, and then refastened to the holders so that a new wear surface will be in contact with the conveyor belt. When a new wear surface is to be used, the adjusting nut is returned to its original position to provide full adjustment for the new wear surface.

DESCRIPTION OF THE DRAWINGS

FIG. 1 is a perspective view of a conveyor belt and the support mechanism of the present invention.

FIG. 2 is an enlarged side view of a portion of the present invention shown in conjunction with the conveyor belt and a material chute.

FIG. 3 is an exploded view of a portion of the support mechanism showing the relationship of the individual components of the present invention.

DESCRIPTION OF THE PREFERRED EMBODIMENT

FIG. 1 shows the support mechanism 10 in use with a conveyor mechanism 12. The conveyor mechanism 12 has a conveyor belt 14 which moves over idler rollers 16. The idler rollers 16 are supported on struts 18 which are fastened at either end to a pair of stringers 20 which extend longitudinally along the path of the conveyor belt 14. The support mechanism 10 is positioned between a pair of idler rollers 16 with a pair of channel-shaped struts 22 extending transversely between stringers 20. Each end 23 of the struts 22 is fastened to a stringer 20 by base plate 24. Four vertical supports shown in the form of adjustable posts 26 extend upwardly from a respective end 23 of each of the struts 22, two at each edge of the conveyor belt 14. A pair of slider bars 28 are shown, each bar 28 extending along each respective edge of the conveyor belt 14, each slider bar 28 being adjustably connected to a pair of posts 26 by adjustment mechanisms 30. In some installations it may be advantageous to position support members underneath the conveyor belt and toward the center.

As can be seen in FIGS. 2 and 3, the slider bar 28 has an upper wear surface 32 and a lower wear surface 34 with webs 36 and 38 extending between wear surfaces 32 and 34. The wear surfaces 32 and 34 are formed of a low friction material which furnishes a sliding wear surface, such as, for example, an ultra high molecular weight polyethylene. In the preferred embodiment, the entire slider bar 28 is formed from this material and is hollow defining an opening through its center. It is also possible, however, to have the slider bar formed of metal and have wear surfaces 32 and 34 of low friction material coated on the metal surfaces. A support tube 40 may be removably inserted into the slider bar 28, closely fitting between the wear surfaces 32 and 34 and the webs 36 and 38. The support tube adds rigidity to the bar 28, particularly in installations where the distances between the supports is great and/or the impact loads are high. The support tube 40 and the webs 36 and 38 are provided with apertures 42 through which bolt 44 and nut 46 extend.

The support mechanism includes a holder or mounting member 48 and an adjusting nut 50. The holder 48 has a pair of ears 52 with each ear 52 having an aperture 54. The ears 52 are adapted to be positioned against a respective web 36 and 38 with apertures 42 and 54 being aligned to allow the insertion of bolt 44 and the fastening of nut 46.

The fastening arrrangement for releasably securing the slider bar 28 to the mounting member 48 allows the slider bars 28 to be easily repositioned to provide a new wear surface once a wear surface has diminished in thickness past a predetermined limit. Typically the thickness of a wear surface will be approximately ⅜ inch with an acceptable wear limit of 3/16 inch. The adjusting nut 50 has a hex head 56 and a round shank 58. A square aperture 60 passes through the head 56 and the shank 58, with the center 62 of the aperture 60 being offset from the center 64 of the shank 58 by a distance D. The shank 58 fits closely within an aperture 66 in holder 48 but does not extend completely through aperture 66. The adjusting nut 50 and the holder 48 are releasably fastened to the post 26 by inserting a carriage bolt 68 having a round shaft portion 70 and a square shoulder portion 72 through the square aperture 60, the aperture 66 in the holder 48, and the apertures 74 in the post 26, with the square shoulder portion 72 fitting closely within the square aperture 60 and the round shaft portion 70 fitting closely within the apertures 74. A compression washer 76 is fitted over the end of the carriage bolt 68 and a nut 78 is then tightened on the carriage bolt 68 thereby compressing the holder 48 between the adjustable post 26 and the head 56 of the adjusting nut 50. When initial installation of the slider bar is made, prior to tightening the nut 78, the holder 48 may be angularly adjusted as shown in FIG. 2 to conform the wear surface 32 to the desired troughing angle of the edge of the belt 14. Once the nut 78 is tightened this angular relationship remains fixed.

As best shown in FIGS. 2 and 3, the adjustable post 26 has a lower leg support tube 80 and an upper leg support tube 82. The lower leg support tube 80 has a first end 84 affixed to an end 23 of a strut 22 and extends upwardly therefrom to a second open end 86. The upper leg support tube 82 extends concentrically within the lower leg support tube 80 and may be adjusted up or down to any desired position. This position may then be fixed as by welding or may remain adjustable by providing pins and apertures (not shown) as is well known in automotive jack-stands.

As seen in FIG. 2, the support mechanism 10 may be used in conjunction with a skirt board arrangment mounted on a material chute 88, or simply a backing plate mounted above the conveyor belt 14. The material chute 88 is shown having a chute wall 90 with a wear plate 92 positioned in the interior of chute 88. A backing plate 94 is affixed to the exterior of the chute wall 90 and a skirt 96 extends therefrom. The upper leg support tube 82 is initially positioned so that the upper wear surface 32 will slidingly engage the conveyor belt 14 between the upper wear surface 32 and the skirt 96 thereby supporting the conveyor belt 14 and creating a seal between the conveyor belt 14 and the skirt 96.

As the upper wear surface 32 wears down, the conveyor belt 14 will begin to sag and the seal with the skirt 96 will be broken. When this begins to happen, the carriage bolt 68 is loosened and the adjusting nut 50 is rotated to raise the worn wear surface 32 back to its original position to maintain a seal with the skirt 96. This process is repeated as the wear surface 32 continues to wear until all the adjustment in the adjusting nut 50 is used or until the wear surface 32 is worn beyond an acceptable predetermined limit. Once this occurs, the adjusting nut 50 will be rotated back to its original unadjusted position, and the slider bar 28 will be removed from the adjusting mechanism 30 and rotated 180° so that the lower wear surface 34 will now be in sliding engagement with the conveyor belt 14. As the lower wear surface 34 wears the adjustment mechanism 30 is used for adjustment as with the upper wear surface 32.

Once both wear surfaces 32 and 34 are worn through, the slider bar 28 may be removed and discarded after removing the support tube 40. The support tube 40 is then inserted into a new slider bar 28 which is fastened to the adjustment mechanism 30.

Various features of the invention have been particularly shown and described in connection with the illustrated embodiments of the invention, however, it must be understood that these particular arrangements merely illustrate, and that the invention is to be given its fullest interpretation within the terms of the appended claims.

What is claimed is:

1. A conveyor belt support mechanism comprising at least one vertical support disposed beneath said conveyor belt, at least one mounting member connected to said vertical support, at least one slider bar having a plurality of wear surfaces, each of which are adapted to be positioned in sliding supporting engagement under said conveyor belt, fastening means releasably securing said slider bar to said mounting member whereby said slider bar is readily removable and repositionable such that when one of said wear surfaces becomes worn beyond an acceptable limit said slider bar can be repositioned to place another wear surface in supporting engagement with said conveyor belt, and adjustment means associated with said mounting member and said vertical support for varying the position of said mounting member and said associated slider bar with respect to said conveyor belt so as to compensate for wear to said wear surfaces.

2. The conveyor belt support mechanism of claim 1, wherein said slider bar comprises a pair of flanges spaced equidistant from one another with a pair of webs extending between said flanges and being spaced equidistant from one another, said flanges being composed of low friction material which defines said wear surface, said flanges and said webs forming a rectanglar opening extending through said sliding bar, wherein said wear surface may alternatively be positioned against said conveyor belt.

3. The conveyor belt support mechanism of claim 2 including a rectangular support tube positionable through said rectangular opening of said slider bar, said support tube providing added rigidity for said slider bar.

4. The conveyor belt support mechanism of claim 3 wherein said support tube is in sliding engagement with said slider bar allowing for the easy insertion or removal of said support tube from said slider bar.

5. The conveyor belt support mechanism of claim 1 wherein said slider bar comprises a rectangular tube composed of low friction material.

6. The conveyor belt support mechanism of claim 1 wherein said wear surfaces are composed of ultra high molecular weight polyethylene.

7. The conveyor belt support mechanism of claim 1 wherein said adjustment means comprises:
   an adjusting nut connected to said mounting member and said vertical support, said adjusting nut having a head and a shank affixed to said head and an offset aperture extending through said head and said shank; and
   means to connect said adjusting nut and said mounting member to said vertical support such that rotation of said adjusting nut is operative to vary the position of said mounting member and associated slider bar with respect to said conveyor belt to compensate for wear to said wear surfaces.

8. The conveyor belt support mechanism of claim 1 wherein said vertical support includes an adjustable post, said post comprising a lower leg support and an upper leg support, said upper and lower leg supports fitting concentrically within one another so that the overall length of said adjustable post may be varied.

9. The conveyor belt support mechanism of claim 1 in which said mounting members are disposed underneath each edge of said conveyor belt so as to position a slider bar in sliding supporting engagement with each edge of said conveyor belt.

* * * * *